United States Patent [19]
Spiecens

[11] 3,959,816
[45] May 25, 1976

[54] METHOD AND APPARATUS FOR INTERPRETING BINARY DATA

[76] Inventor: Camil P. Spiecens, 264 E. Broadway, New York, N.Y. 10002

[22] Filed: Feb. 24, 1975

[21] Appl. No.: 552,125

[52] U.S. Cl. .................................................. 360/44
[51] Int. Cl.² .......................................... G11B 5/09
[58] Field of Search ........................... 360/44, 51, 52

[56] References Cited
UNITED STATES PATENTS 3,281,806   10/1966   Lawrance et al. ..................... 360/44
3,720,927   3/1973   Wolf ..................................... 360/44

Primary Examiner—Vincent P. Canney
Attorney, Agent, or Firm—Hane, Sullivan & Spiecens

[57] ABSTRACT

Serially received data bits represented by the positions of signal-amplitude transitions within bit cells are interpreted by measuring the entire duration of a preceding bit cell and utilizing a fraction of such entire duration to sample for the time of occurrence of the signal-amplitude transition in a succeeding bit cell.

10 Claims, 2 Drawing Figures

U.S. Patent    May 25, 1976    3,959,816

METHOD AND APPARATUS FOR INTERPRETING BINARY DATA

This invention pertains to the interpretation of binary-represented data and more particularly to the interpretation of data in serially received bit cells.

The serial transmission of data bits, one per data cell, has many applications. Such a technique is extremely useful in the transmission of data over telephone channels or in the transmission of data to and from a magnetic medium such as a disk, drum tape or card.

Figure 1:
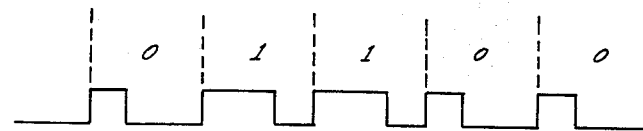

There have recently become available inexpensive magnetic tape cassette systems wherein the speed of the tape past the read/record head can vary over considerable limits. In order to make the interpretation of the data selfclocking there has been proposed a recording scheme wherein in effect the width of the pulse within a bit cell represents the data bit, i.e., if the cell has one width it represents a binary one and if it has another width it represents a binary zero. This representation is shown in FIG. 1 below as well as in U.S. Pat. No. 2,887,674 and 3,720,927. While the former patent shows the generation of such a waveform it is speed sensitive since data recovery relies on sampling utilizing fixed and invarient time intervals which cannot be changed even if the speed of the tape changes.

On the other hand U.S. Pat. No. 3,720,927 teaches a speed insensitive system since the data is interpreted by utilizing the ratio of the time between the start of the data cell and the transition and the time between the transition and the end of the data. The appearance of this patent has created a demand of different and improved recovery systems which are speed insensitive. It is accordingly an object of the invention to provide improved methods and apparatus for recovering binary data represented by the widths of pulses.

Figure 2:
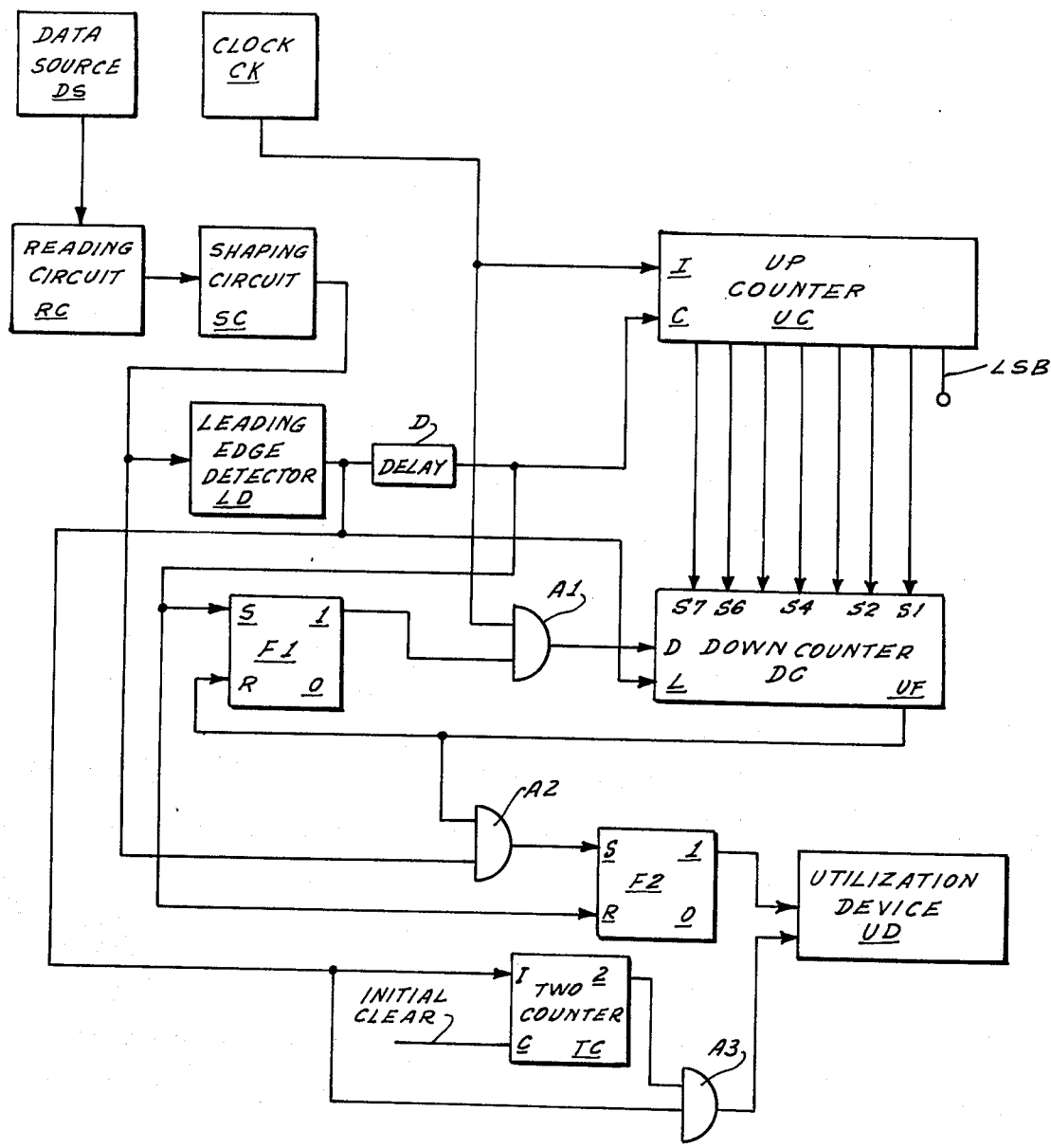

Other objects, the features and advantages of the invention will be apparent from the following detailed description when read with the accompanying drawing, wherein:

FIG. 1 is a waveform showing how data is represented according to the invention; and FIG. 2 shows apparatus for interpreting the data represented by the waveform of FIG. 1.

The waveform of FIG. 1 shows five serial bit cells representing, assuming time flows from left to right, the binary digits (bits) 01100. It should be noted that each bits cell starts with a positive going transition (leading edge) and has a negative going transition at a point either one third (binary zero) or two thirds (binary one) along the length (or duration) of the cell. While one-third and two-third points are shown, different unique points within the cell can be used, such as one-quarter and three-quarters. Note also each cell ends with a third transition which is actually the first transition of the next cell.

The invention is predicated on the assumption that although the speed at which a magnetic medium such as a reel-to-reel driven tape moves past the reading head can vary over very wide ranges or will be played back at different speeds from recording, the change in speed between one cell and the nearest adjacent cells and particularly the immediately adjacent cell because of inertia and the like will only slightly vary. Thus the time duration of one bit cell can be used to sample for the time of occurrence of the transition of the next occurring cell.

In FIG. 2 there is shown a system utilizing this concept. The data bits come from data source DS which can be a single track magnetic tape and are read by reading circuits RC which can be a magnetic recording head opposite the track as well as well known amplifier circuits. Since the voltage waveform from the reading circuits is not sharp it is customary to process the voltage waveform in a conventional shaping circuit SC. The resulting waveform is that shown in FIG. 1. Note from hereon positive logic will be assumed. However, it should be noted that negative or even hybrid logic can be used. It will also be assumed that the first bit cell does not carry meaningful final data but is merely a start of block markers, i.e., the bit can be a one or zero and will not be accepted by the final utilization device.

Initially when reading was called for, an initial clear signal from a source not shown is fed to input C for initializing two counter TC to a zero count. (Two counter TC is merely a counter which can count to two in response to pulses received at input I and will emit a signal from output 2 until again being initialized. It can be a pulse counter and a flip-flop. The pulse count counts pulses. When it counts two pulses it sets the flip-flop. The counter and flip-flop are both reset by the initial clear signal.)

All the time clock CK has been emitting periodically occurring pulses at a rate considerably faster (such as one hundred) than the nominal bit cell repetition rate. These pulses are fed to the incrementing input I of up counter UC which can be a conventional eight stage cascaded binary counter having a clear to zero input C. If an eight stage counter is used a count of 256 can be accumulated. The outputs of the seven more significant stages of up counter UC are fed to the inputs of the seven stages of presentable down counter DC. (Down counter DC is a conventional down counter which upon receipt of a signal at load input L will accept the count number at inputs S1 to S7 and unit decrement this count number for each pulse received at input D. In addition, the counter will emit a pulse on output UF whenever the stored count goes below zero, i.e. underflows). Carefully note that by transferring only the count stored in the seven more significant stages of counter UC into the counter DC, a division by two is performed, i.e., the number received by counter DC is one-half the number accumulated by counter UC.

Now, the output of shaping circuit SC is fed to leading edge detector LD which can be a one-shot multivibrator that emits a narrow pulse each time it receives a positive going transient at its input, i.e., acts as a differentiator. The pulse from leading edge detector LD is first fed to the load input L of counter DC causing one half the count number of counter UC to be fed to counter DC. Then after a slight delay introduced by delay D the pulse clears counter UC to zero so that the duration of a bit cell can be measured. At the same time the pulse sets flip-flop F1 which opens AND-circuit A1. Clock pulses start passing through this circuit and unit decrementing commences. Also at the same time the pulse resets flip-flop F2. When the underflow occurs a pulse is transmitted from output UF: to reset flip-flop F1 stopping the decrementing of the counter DC; and to sample AND-circuit A2 whose second input is connected to the output of shaping circuit SC. If the output of the shaping circuit is high flip-flop F2 is set, otherwise it remains reset. The output of flip-flop F2 is connected to utilization device UD which is periodically started by the output of AND-circuit A3. Utilization device UD can be a buffer shift register with the output of AND-circuit A3 supplying the shift pulses.

Now, it should be realized that the first and second leading edges detected at the start of operation must be ignored by the utilization device UD since they are not associated with valid data at the output of flip-flop F2. Accordingly, two counter TC which counts leading edge pulses from detector LD only opens AND-circuit A3 to pass the third and subsequent such pulses.

In practice, the first leading edge pulse at the start of the second bit call and the end of the first bit cell transfers one-half the count (one half the time duration of the first bit call) to the down counter DC. Then the up counter UC is cleared to start measuring the time duration of the second bit cell. At the same time down counter DC starts decrementing. When this counter underflows (nominally halfway through the second bit cell) the amplitude of the signal at the output of shaping circuit SC is sampled at AND-circuit A2. If the amplitude is high indicating the second bit cell contains a binary one flip-flop F2 is set, otherwise it remains reset. At the third leading edge (the end of the first bit cell containing valid data) the first strobe or shift pulse is fed to AND-circuit A3 to store the first data bit. Thereafter these cycles repeat as long as data is read.

What is claimed is:

1. In a system serially transferring bits of data wherein the bits of data are represented by signals in bit cells defined by displaced first and second transitions of a signal amplitude in a first direction and wherein the type of bit within a cell is defined by the position within a bit cell of a third transition of the signal amplitude in a second and opposite direction between said first and second transitions such that a first type of bit is represented when said third transition is closer to said first transition than said second transition and a second type of bit is represented when said third transition is closer to said second transition than said first transition, the method of identifying which type of bit is represented by the signal occurring within a bit cell comprising the steps of measuring the entire duration of a bit cell preceding the bit cell whose bit type is to be identified, forming a predetermined fraction of time of such duration, and determining whether the time between the first and third transitions of the bit cell whose type is to be identified is greater or less than the formed predetermined fraction of the time of the entire duration of said preceding bit cell.

2. The method of claim 1, wherein said preceding bit cell is the bit cell immediately preceding the bit cell whose type is to be identified.

3. The method of claim 1 wherein said predetermined fraction is one half.

4. In a system serially transferring bits of data wherein the bits of data are represented by signals in bit cells defined by displaced first and second transitions of a signal amplitude in a first direction and wherein the type of bit within a cell is defined by the position within a bit cell of a third transition of the signal amplitude in a second and opposite direction between said first and second transitions such that a first type of bit is represented when said third transition is closer to said first transition than said second transition and a second type of bit is represented when said third transition is closer to said second transition than said first transition, apparatus for identifying which type of bit is represented by the signal occurring within a bit cell comprising measuring means for measuring and forming a representation of the entire duration of a bit cell preceding the bit cell whose bit type is to be identified, registering means for forming and storing a representation of a predetermined fraction of the time of said duration, and sampling means under the control of said registering means for determining whether the time between the first and third transitions of the bit cell whose type is to be identified is greater or less than the formed predetermined fraction of the time of the entire duration of said preceding bit cell.

5. The apparatus of claim 4 wherein said preceding bit cell is the bit cell immediately preceding the bit cell whose type is to be identified.

6. The apparatus of claim 4 wherein said predetermined fraction is one half.

7. The apparatus of claim 4 wherein said measuring means comprises a source of clock pulses, a first pulse counter connected to said source of clock pulses for accumulating counts thereof, and detecting means for detecting the first and third transitions of the bits cells and means responsive to said detecting means for periodically clearing the counts accumulated by said first pulse counter.

8. The apparatus of claim 7 wherein said registering means comprises a second pulse counter, and connecting means for connecting said first pulse counter to said second pulse counter in such a way that a certain fraction of the pulse count accumulated in said first pulse counter is periodically transferred to said second pulse counter under control of said detection means, said second pulse counter being a deaccumulating counter, and means for connecting said second pulse counter to said source of clock pulses for deaccumulating the pulse counts received by said second pulse counter from said first pulse counter.

9. The apparatus of claim 8 wherein said first pulse counter has ($n$) binary positions and said second pulse counter has ($n-1$) binary positions and said connecting means comprises means for connecting the outputs of the ($n-1$) more significant binary positions to the corresponding inputs of the ($n-1$) binary position of said second pulse counter.

10. The apparatus of claim 9 wherein said sampling means comprises means for sampling the amplitude of the signal bit cell only after the count in said second pulse counter has been deaccumulated to a predetermined value.

* * * * *